US009738331B2

(12) United States Patent
Ito et al.

(10) Patent No.: US 9,738,331 B2
(45) Date of Patent: Aug. 22, 2017

(54) VEHICLE LOWER PORTION STRUCTURE

(71) Applicant: TOYOTA JIDOSHA KABUSHIKI KAISHA, Toyota-shi (JP)

(72) Inventors: Keita Ito, Nissin (JP); Masahiro Ishikawa, Toyota (JP); Kenichiro Yoshimoto, Tokai (JP); Masato Kanbe, Ichinomiya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/917,891

(22) PCT Filed: Aug. 12, 2014

(86) PCT No.: PCT/JP2014/071517
§ 371 (c)(1),
(2) Date: Mar. 9, 2016

(87) PCT Pub. No.: WO2015/037393
PCT Pub. Date: Mar. 19, 2015

(65) Prior Publication Data
US 2016/0221615 A1 Aug. 4, 2016

(30) Foreign Application Priority Data
Sep. 11, 2013 (JP) ................................. 2013-188472

(51) Int. Cl.
B62D 35/00 (2006.01)
B62D 35/02 (2006.01)
B60K 11/06 (2006.01)

(52) U.S. Cl.
CPC .............. B62D 35/02 (2013.01); B60K 11/06 (2013.01)

(58) Field of Classification Search
CPC .................................. B62D 35/02; B60K 11/06
(Continued)

(56) References Cited

U.S. PATENT DOCUMENTS 5,042,870 A 8/1991 Yura
6,435,298 B1 8/2002 Mizuno et al.
(Continued)

FOREIGN PATENT DOCUMENTS

EP 1 013 540 A2 6/2000
EP 2 557 024 A1 2/2013
(Continued)

OTHER PUBLICATIONS

International Search Report and Written Opinion Issued Nov. 11, 2014, in PCT/JP2014/071517 Filed Aug. 12, 2014.

Primary Examiner — Joseph D Pape
(74) Attorney, Agent, or Firm — Oblon, McClelland, Maier & Neustadt, L.L.P.

(57) ABSTRACT

At a vehicle lower portion structure S1, a first inclined portion 24 is formed at a rear end portion of a first undercover 20, and a second inclined portion 34 is formed at a front end portion of a second undercover 30. The second inclined portion 34 overlaps at least a portion of the first inclined portion 24 as seen in a vehicle plan view and a vehicle front view. An exhaust portion 40 is demarcated and formed by the first inclined portion 24 and the second inclined portion 34. An underfloor space UA and a space within an engine compartment 12 are communicated by the exhaust portion 40. Hot air within the engine compartment 12 can be made to flow via the exhaust portion 40 toward the underfloor space UA.

8 Claims, 4 Drawing Sheets

(58) Field of Classification Search
USPC ............................. 296/180.1, 204; 180/346
See application file for complete search history.

(56) References Cited

U.S. PATENT DOCUMENTS 8,668,254 B2 * 3/2014 Onodera ................ B62D 35/02
  180/69.1
2013/0026783 A1 1/2013 Kakiuchi et al.

FOREIGN PATENT DOCUMENTS

| JP | 58 2319 | 8/1983 |
| JP | 58 153175 | 10/1983 |
| JP | 63 14426 | 1/1988 |
| JP | 2007 38838 | 2/2007 |

* cited by examiner

VEHICLE LOWER PORTION STRUCTURE

TECHNICAL FIELD

The present invention relates to a vehicle lower portion structure that has an undercover.

BACKGROUND ART

In the vehicle lower portion structure disclosed in Japanese Patent Application Laid-Open (JP-A) No. S58-153175, a floor cover (undercover) covers substantially the entire surface of a vehicle floor from the vehicle lower side. Due thereto, the lower portion of the vehicle can be structured by a flat surface by the floor cover. As a result, the air resistance of the vehicle can be lessened, and the aerodynamic performance of the vehicle can be improved.

SUMMARY OF INVENTION

Technical Problem

However, in the above-described vehicle lower portion structure, because the floor cover covers substantially the entire surface of the vehicle floor from the vehicle lower side as described above, within the engine compartment for example, hot air after having cooled the power unit stagnates within the engine compartment. Therefore, there is the possibility that this hot air may be transmitted to the vehicle cabin interior.

To address this, for example, it has been thought to provide a discharge opening, for discharging this hot air, at the floor cover. However, the hot air that is discharged from the discharge opening, and the airflow that flows at the underfloor space of the vehicle toward the vehicle rear side, interfere with one another, and there is the possibility that the aerodynamic performance of the vehicle may deteriorate.

In consideration of the above-described circumstances, an object of the present invention is to provide a vehicle lower portion structure that can discharge hot air, that is within an engine compartment, to the vehicle exterior while improving the aerodynamic performance of the vehicle.

Solution to Problem

A vehicle lower portion structure relating to a first aspect of the present invention has: a first undercover that is provided at a vehicle lower portion, and that covers, from a vehicle lower side, an engine compartment that is at a vehicle front portion; a second undercover that is provided at a vehicle rear side of the first undercover, and that covers, from a vehicle lower side, an underfloor that is at a vehicle rear side of the first undercover; a first inclined portion that structures a rear end portion of the first undercover, and that is bent toward a vehicle lower side and a vehicle rear side; and a second inclined portion that structures a front end portion of the second undercover, that is bent toward a vehicle upper side and a vehicle front side, that is disposed so as to be apart from the first inclined portion at a vehicle rear side of the first inclined portion, and that overlaps at least a portion of the first inclined portion as seen in at least one of a vehicle plan view or a vehicle front view.

In the vehicle lower portion structure relating to the first aspect of the present invention, the first undercover and the second undercover are provided at the vehicle lower portion. Further, the first undercover covers, from the vehicle lower side, the engine compartment that is at the vehicle front portion. Further, the second undercover is disposed at the vehicle rear side of the first undercover, and covers, from the vehicle lower side, the underfloor that is at the vehicle rear side of the first undercover. Due thereto, airflow, that flows at the underfloor space of the vehicle toward the vehicle rear side (hereinafter, this airflow is called the "underfloor airflow"), flows toward the vehicle rear side along the bottom surface of the first undercover and the bottom surface of the second undercover. Accordingly, air resistance at the lower portion of the vehicle can be reduced, and the aerodynamic performance of the vehicle can be improved.

Here, a first inclined portion is formed at the rear end portion of the first undercover, and the first inclined portion is bent toward the vehicle lower side and the vehicle rear side. Further, the second inclined portion is formed at the front end portion of the second undercover, and the second inclined portion is bent toward the vehicle upper side and the vehicle front side, and is disposed so as to be apart from the first inclined portion at the vehicle rear side thereof. Further, the second inclined portion overlaps at least a portion of the first inclined portion as seen in at least one of a vehicle plan view or a vehicle front view. Therefore, a region, that is demarcated by the first inclined portion and the second inclined portion and that opens in the vehicle vertical direction (hereinafter this region is called the "exhaust portion"), is formed between the first undercover and the second undercover. Further, the underfloor space of the vehicle and the space within the engine compartment are communicated by the exhaust portion. Due thereto, hot air within the engine compartment can be made to flow via the exhaust portion toward the underfloor space (hereinafter, this airflow is called the "exhaust flow").

Moreover, the first inclined portion and the second inclined portion are inclined toward the vehicle lower side and the vehicle rear side as seen in a side view. Therefore, the exhaust flow flows along the first inclined portion and the second inclined portion toward the vehicle lower side and the vehicle rear side, and is discharged-out from the exhaust portion. Thus, the exhaust flow can be smoothly merged with the underfloor airflow. Due thereto, hot air within the engine compartment can be made to flow toward the underfloor space while generation of turbulent flow at the underfloor space is suppressed.

In a vehicle lower portion structure relating to a second aspect of the present invention, in the vehicle lower portion structure relating to the first aspect of the present invention, an inclination angle at a root portion of the second inclined portion with respect to a vehicle longitudinal direction is set to be greater than or equal to an inclination angle at a root portion of the first inclined portion with respect to the vehicle longitudinal direction.

In the vehicle lower portion structure relating to the second aspect of the present invention, the inclination angle at the root portion of the second inclined portion is set to be greater than or equal to the inclination angle at the root portion of the first inclined portion. Therefore, the opening surface area of the outflow opening at the exhaust portion (the opening portion at the underfloor space side) can be set to be less than or equal to the opening surface area of the inflow opening at the exhaust portion (the opening portion at the engine compartment side). Thus, in accordance with a continuous expression of the flow, the velocity of the exhaust flow that is discharged-out from the outflow opening of the exhaust portion increases. Due thereto, hot air within the engine compartment can be discharged-out well from the exhaust portion.

In a vehicle lower portion structure relating to a third aspect of the present invention, in the vehicle lower portion structure relating to the first or second aspect of the present invention, a guide portion, that extends from a distal end of the first inclined portion toward the second inclined portion side, is formed at the first inclined portion.

In the vehicle lower portion structure relating to the third aspect of the present invention, the guide portion extends from the distal end of the first inclined portion toward the second inclined portion side (i.e., the exhaust portion side). Therefore, the generation of vortex flow that winds-in around the distal end portion of the first inclined portion can be suppressed. Namely, if the guide portion were to be omitted from the first inclined portion, there is the possibility that the underfloor airflow, that flows along the first inclined portion toward the distal end side of the first inclined portion, would be separated at the distal end of the first inclined portion and would flow so as to wind-in around the distal end portion of the first inclined portion (vortex flow would arise). In contrast, in the invention of the third aspect, the guide portion extends from the distal end of the first inclined portion toward the second inclined portion side, and therefore, the underfloor airflow that reaches the distal end of the first inclined portion flows along the guide portion. Thus, separation of the underfloor airflow at the distal end of the first inclined portion is suppressed, and vortex flow arising at the distal end portion of the first inclined portion can be suppressed. As a result, hot air within the engine compartment can be discharged-out even better from the exhaust portion.

In a vehicle lower portion structure relating to a fourth aspect of the present invention, in the vehicle lower portion structure relating to any one of the first through third aspects of the present invention, the second inclined portion is structured by plural divisional inclined portions, and at an adjacent pair of the divisional inclined portions, an inclination angle at a root portion of a divisional inclined portion that is disposed at a vehicle lower side is set to be smaller than an inclination angle at a root portion of a divisional inclined portion that is disposed at a vehicle upper side.

In the vehicle lower portion structure relating to the fourth aspect of the present invention, the second inclined portion is structured by plural divisional inclined portions. Further, at an adjacent pair of divisional inclined portions, the inclination angle at the root portion of the divisional inclined portion, that is disposed at the vehicle lower side, is set to be smaller than the inclination angle at the root portion of the divisional inclined portion that is disposed at the vehicle upper side. Namely, the second inclined portion is inclined so as to approach the vehicle longitudinal direction while heading toward the vehicle lower side. Therefore, air resistance of the exhaust flow that flows along the second inclined portion can be reduced. Due thereto, hot air within the engine compartment can be discharged efficiently from the exhaust portion.

In a vehicle lower portion structure relating to a fifth aspect of the present invention, in the vehicle lower portion structure relating to any one of the first through fourth aspects of the present invention, a distal end of the first inclined portion is disposed further toward a vehicle lower side than the second undercover.

In the vehicle lower portion structure relating to the fifth aspect of the present invention, the distal end of the first inclined portion is disposed further toward the vehicle lower side than the second undercover, and therefore, the distal end portion of the first inclined portion projects-out further toward the vehicle lower side than the second undercover.

Thus, at the space at the vehicle rear side of the outflow opening of the exhaust portion (the space at the vehicle rear side of the distal end portion of the first inclined portion), the flow of the underfloor airflow is obstructed by the distal end portion of the first inclined portion. Further, a portion of the exhaust flow, that is discharged-out from the exhaust portion, flows into this space where the flow of the underfloor airflow is obstructed. Therefore, interference between the exhaust flow and the underfloor airflow can be suppressed. As a result, generation of turbulent flow at the underfloor space can be suppressed more.

In a vehicle lower portion structure relating to a sixth aspect of the present invention, in the vehicle lower portion structure relating to any one of the first through fifth aspects of the present invention, the second inclined portion overlaps at least a portion of the first inclined portion as seen in a vehicle plan view and a vehicle front view.

In the vehicle lower portion structure relating to the sixth aspect of the present invention, the second inclined portion overlaps at least a portion of the first inclined portion as seen in a vehicle plan view and a vehicle front view. Therefore, as seen from a direction orthogonal to the first inclined portion, the amount by which the first inclined portion and the second inclined portion overlap can be made to be large. Due thereto, within the exhaust portion, the distance over which the exhaust flow flows along both the second inclined portion and the first inclined portion can be set to be long. Accordingly, the flow adjusting effect of the second inclined portion and the first inclined portion on the exhaust flow can be strengthened.

Advantageous Effects of Invention

In accordance with the vehicle lower portion structure relating to the first aspect of the present invention, hot air within the engine compartment can be discharged-out to the vehicle exterior while the aerodynamic performance of the vehicle is improved.

In accordance with the vehicle lower portion structure relating to the second aspect of the present invention, hot air within the engine compartment can be discharged-out to the vehicle exterior well.

In accordance with the vehicle lower portion structure relating to the third aspect of the present invention, hot air within the engine compartment can be discharged-out to the vehicle exterior even better.

In accordance with the vehicle lower portion structure relating to the fourth aspect of the present invention, hot air within the engine compartment can be discharged-out to the vehicle exterior efficiently.

In accordance with the vehicle lower portion structure relating to the fifth aspect of the present invention, generation of turbulent flow at the underfloor space can be suppressed more.

In accordance with the vehicle lower portion structure relating to the sixth aspect of the present invention, the flow adjusting effect of the second inclined portion and the first inclined portion on the exhaust flow can be strengthened.

DESCRIPTION OF EMBODIMENTS (First Embodiment)

Figure 1:
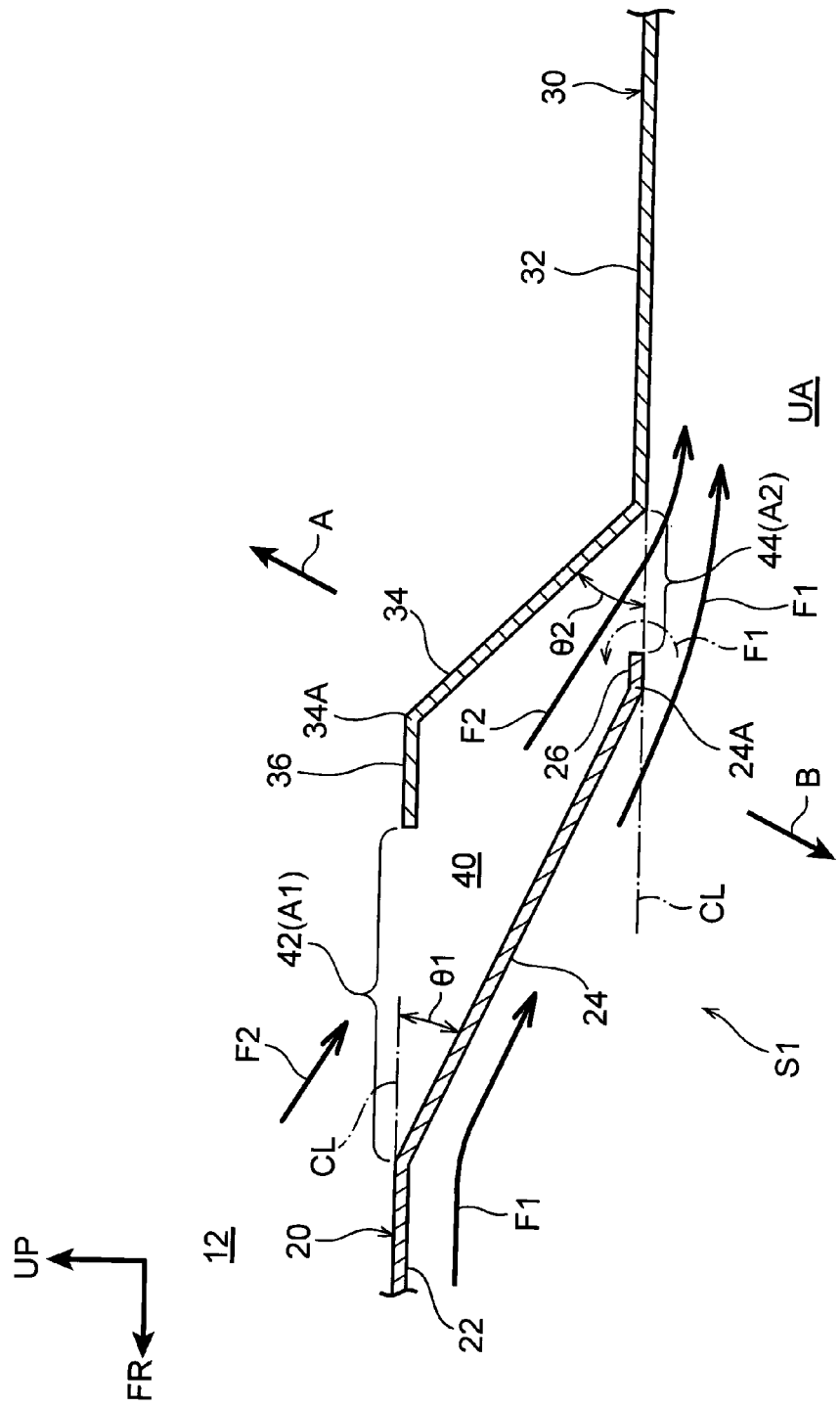
FIG. 1 is a side sectional view (a sectional view along line 1-1 of FIG. 2) that is seen from a vehicle left side and shows, in an enlarged manner, a first inclined portion of a first undercover and a second inclined portion of a second undercover that are used in a vehicle lower portion structure relating to a first embodiment.

A vehicle 10, to which a vehicle lower portion structure S1 relating to a first embodiment is applied, is described hereinafter by using the drawings. Note that, in the drawings, the vehicle front side is indicated by arrow FR, the vehicle left side is indicated by arrow LH, and the vehicle upper side is indicated by arrow UP.

Figure 2:
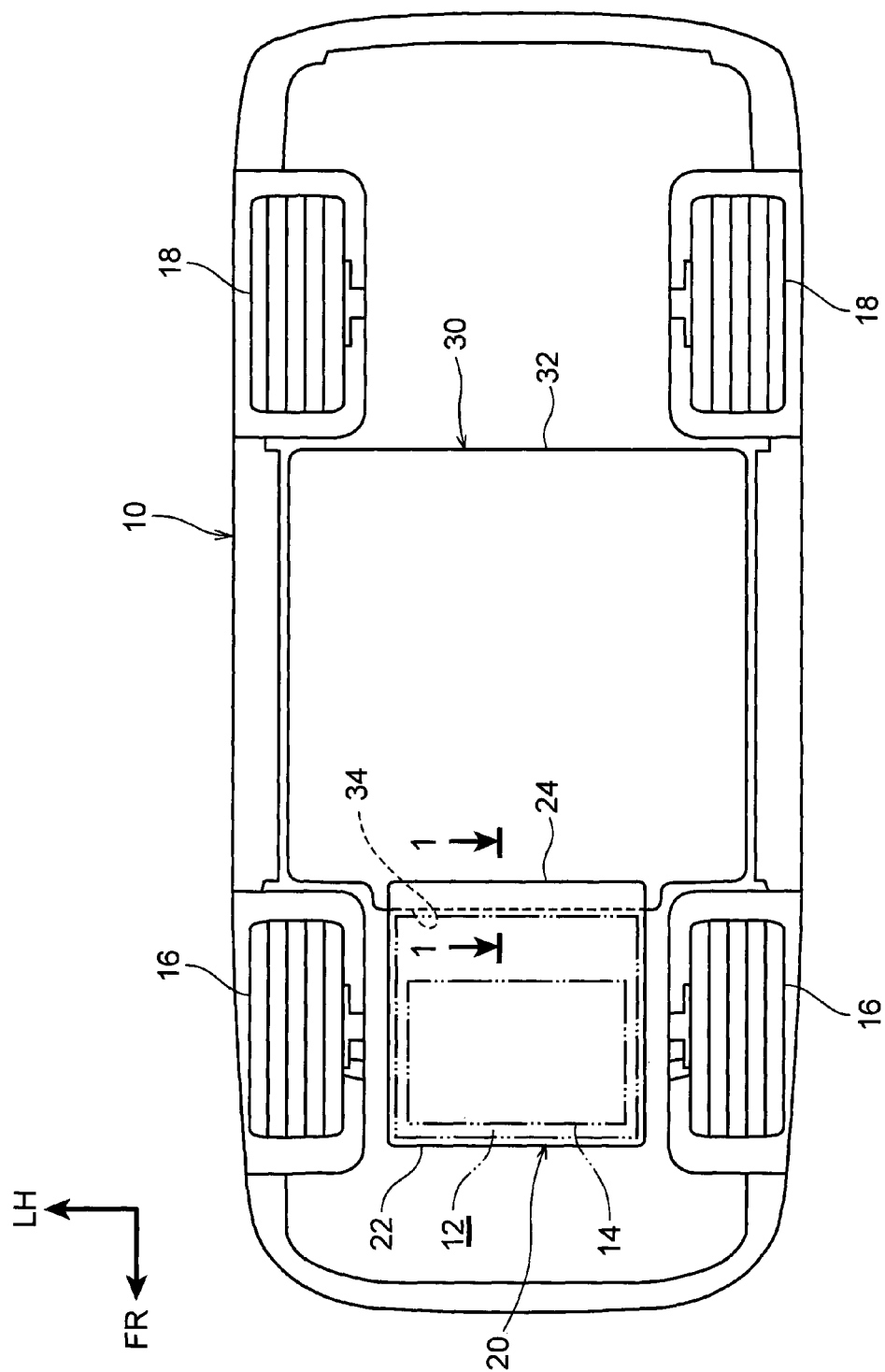
FIG. 2 is a back view that is seen from a vehicle lower side and shows a vehicle to which the vehicle lower portion structure relating to the first embodiment is applied.

The vehicle 10 is shown in FIG. 2 in a back view seen from the vehicle lower side. As shown in this drawing, the vehicle 10 has a first undercover 20 and a second undercover 30. The first undercover 20 and the second undercover 30 are structured by resin materials, and are mounted to the lower portion of the vehicle 10.

The first undercover 20 is structured to include a first undercover main body portion 22 that is formed in a substantially rectangular plate shape, and a first inclined portion 24 that structures the rear end portion of the first undercover 20. The plate thickness direction of the first undercover main body portion 22 is the vehicle vertical direction, and the first undercover main body portion 22 is disposed between a pair of front wheels 16 so as to cover an engine compartment 12 that is at the front portion of the vehicle 10 from the vehicle lower side. Note that a power unit 14, for driving the front wheels 16 and the like, is disposed within the engine compartment 12.

The first inclined portion is formed in a substantially rectangular plate shape whose length direction is the vehicle transverse direction, and, as shown in FIG. 1, as seen in side view, is bent from the rear end of the first undercover main body portion 22 so as to extend toward the vehicle lower side and the vehicle rear side. Further, at the root portion of the first inclined portion 24, the angle formed by a reference line CL, that runs along the vehicle longitudinal direction, and the first inclined portion 24 is inclination angle θ1. Note that two angles that are an acute angle and an obtuse angle exist as angles formed by the reference line CL and the first inclined portion 24, but the inclination angle at the root portion of the first inclined portion 24 in the present invention means the angle that is the acute angle. Further, a guide portion 26 is formed integrally with the first inclined portion 24, and the guide portion 26 extends toward the vehicle rear side from a distal end (lower end) 24A of the first inclined portion 24.

As shown in FIG. 2, the second undercover 30 is disposed adjacent to the vehicle rear side of the first undercover 20, and is structured to include a second undercover main body portion 32, that is formed in a substantially rectangular plate shape, and a second inclined portion 34, that structures the front end portion of the second undercover 30.

The plate thickness direction of the second undercover main body portion 32 is the vehicle vertical direction, and the second undercover main body portion 32 is disposed between the front wheels 16 and rear wheels 18, and covers the underfloor at the vehicle rear side of the first undercover 20 of the vehicle 10 from the vehicle lower side. Further, as shown in FIG. 1, the position of the second undercover main body portion 32 in the vehicle vertical direction, and the position of the distal end 24A of the first inclined portion 24 in the vehicle vertical direction, substantially coincide.

The second inclined portion 34 is formed in a substantially rectangular plate shape whose length direction is the vehicle transverse direction, and is bent from the front end of the second undercover main body portion 32 so as to extend toward the vehicle upper side and the vehicle front side. In other words, as seen in side view, the second inclined portion 34 is inclined toward the vehicle lower side and the vehicle rear side, and the second undercover main body portion 32 extends toward the vehicle rear side from the lower end of the second inclined portion 34. Further, the second inclined portion 34 is disposed so as to be apart from the first inclined portion 24 at the vehicle rear side thereof, and is disposed so as to face the first inclined portion 24 in a direction orthogonal to the first inclined portion 24 (the arrow A and arrow B direction in FIG. 1). Further, at the root portion of the second inclined portion 34, the angle formed by the reference line CL, that runs along the vehicle longitudinal direction, and the second inclined portion 34 is inclination angle θ2, and the inclination angle θ2 is set so as to be greater than or equal to the inclination angle θ1 of the first inclined portion 24. Note that two angles that are an acute angle and an obtuse angle exist as angles formed by the reference line CL and the second inclined portion 34, but the inclination angle at the root portion of the second inclined portion 34 in the present invention means the angle that is the acute angle.

The position of a distal end (upper end) 34A of the second inclined portion 34 in the vehicle vertical direction, and the position of the first undercover main body portion 22 in the vehicle vertical direction, substantially coincide. Due thereto, as seen in a vehicle front view that is viewed from the vehicle front side, the entire second inclined portion 34 overlaps the first inclined portion 24. On the other hand, the distal end 34A of the second inclined portion 34 is disposed further toward the vehicle front side than the distal end 24A of the first inclined portion 24. Due thereto, as seen in a vehicle plan view that is viewed from the vehicle upper side, the distal end 34A of the second inclined portion 34 overlaps the distal end portion of the first inclined portion 24. In other words, as seen in a vehicle plan view, the second inclined portion 34 and a portion of the first inclined portion 24 overlap. Moreover, a flange portion 36 is formed integrally with the second inclined portion 34, and the flange portion 36 extends-out toward the vehicle front side from the distal end 34A of the second inclined portion 34.

Here, as described above, the second inclined portion 34 is disposed so as to be apart from the first inclined portion 24 at the vehicle rear side thereof, and is disposed so as to face the first inclined portion 24 in a direction orthogonal to the first inclined portion 24. Due thereto, a region, that is demarcated by the first inclined portion 24 and the second inclined portion 34 and that opens in the vehicle vertical direction, is formed between the first undercover 20 and the second undercover 30 at the lower portion of the vehicle 10, and this region is an exhaust portion 40. Further, an underfloor space UA of the vehicle 10 and the space within the engine compartment 12 are communicated by the exhaust portion 40. Further, the opening portion, at the engine compartment 12 side, of the exhaust portion 40 is an inflow opening 42, and the opening portion, at the underfloor space UA side, of the exhaust portion 40 is an outflow opening 44. Further, an opening surface area A2 of the outflow opening 44 side of the exhaust portion 40 is set to be less than or equal to an opening surface area A1 of the inflow opening 42 of the exhaust portion 40.

Operation and effects of the first embodiment are described next.

In the vehicle 10 that has the vehicle lower portion structure S1 that is structured as described above, the first undercover 20 and the second undercover 30 are disposed at the lower portion of the vehicle 10. Therefore, when the vehicle 10 travels, underfloor airflow F1 (refer to arrow F1 in FIG. 1), that flows through the underfloor space UA of the vehicle 10 toward the vehicle rear side, flows along the bottom surface of the first undercover 20 and the bottom surface of the second undercover 30. Due thereto, air resistance of the vehicle 10 can be reduced, and the aerodynamic characteristic of the vehicle 10 can be improved.

Here, the first inclined portion 24 is formed at the rear end portion of the first undercover 20, and the first inclined portion 24 is bent toward the vehicle lower side and the vehicle rear side. Further, the second inclined portion 34 is formed at the front end portion of the second undercover 30, and the second inclined portion 34 is bent toward the vehicle upper side and the vehicle front side, and is disposed so as to be apart from the first inclined portion 24 at the vehicle rear side thereof. Further, as seen in a vehicle plan view and a vehicle front view, the second inclined portion 34 overlaps at least a portion of the first inclined portion 24. Therefore, the exhaust portion 40, that is demarcated by the first inclined portion 24 and the second inclined portion 34, is formed between the first undercover 20 and the second undercover 30, and the underfloor space UA and the space within the engine compartment 12 are communicated by the exhaust portion 40. Due thereto, hot air, after having cooled the power unit 14 within the engine compartment 12, can flow via the exhaust portion 40 toward the underfloor space UA (hereinafter, this airflow is called "exhaust flow F2" (see arrow F2 of FIG. 1)). As a result, this hot air stagnating within the engine compartment 12 can be suppressed.

Moreover, because the first inclined portion 24 and the second inclined portion 34 are inclined toward the vehicle lower side and the vehicle rear side as seen in side view, the exhaust flow F2 flows along the first inclined portion 24 and the second inclined portion 34 toward the vehicle lower side and the vehicle rear side, and is discharged-out from the outflow opening 44 of the exhaust portion 40. Therefore, the exhaust flow F2 can be smoothly merged with the underfloor airflow F1. Due thereto, hot air within the engine compartment 12 can be made to flow toward the underfloor space UA while generation of turbulent flow at the underfloor space UA is suppressed. Due thereto, hot air within the engine compartment 12 can be discharged to the vehicle exterior while the aerodynamic performance of the vehicle 10 is improved.

Moreover, the inclination angle θ2 of the second inclined portion 34 is set so as to be greater than or equal to the inclination angle θ1 of the first inclined portion 24. Therefore, the opening surface area A2 of the outflow opening 44 at the exhaust portion 40 can be set to be less than or equal to the opening surface area A1 of the inflow opening 42 at the exhaust portion 40. Due thereto, the velocity of the exhaust flow F2 that is exhausted from the outflow opening 44 can be increased.

Namely, in accordance with a continuous expression of the flow, given that the density of the air is ρ, the velocity of the exhaust flow F2 that passes through the inflow opening 42 is V1, and the velocity of the exhaust flow F2 that passes through the outflow opening 44 is V2, $$\rho \times V1 \times A1 = \rho \times V2 \times A2 \quad (1).$$

Further, transforming above formula (1) results in $$V2 = (A1/A2) \times V1 \quad (2).$$

Further, because the opening surface area A2 is set to be less than or equal to the opening surface area A1, the velocity V2 can be made to be greater than or equal to the velocity V1 in accordance with formula (2). Accordingly, the velocity of the exhaust flow F2 that is discharged-out from the outflow opening 44 can be increased, and hot air within the engine compartment 12 can be discharged-out well from the exhaust portion 40.

Further, the guide portion 26 is formed at the first inclined portion 24, and the guide portion 26 extends from the distal end 24A of the first inclined portion 24 toward the vehicle rear side (the second inclined portion 34 side). Due thereto, the generation of vortex flow that winds-in around the distal end portion of the first inclined portion 24 can be suppressed. Namely, if the guide portion 26 were to be omitted from the first inclined portion 24, there is the possibility that the underfloor airflow F1, that flows along the first inclined portion 24 toward the distal end side of the first inclined portion 24, would be separated at the distal end 24A of the first inclined portion 24 and would flow so as to wind-in around the distal end portion of the first inclined portion 24 (vortex flow would arise) (see arrow F1 shown by the two-dot chain line in FIG. 1). In contrast, in the first embodiment, the guide portion 26 extends from the distal end 24A of the first inclined portion 24 toward the vehicle rear side, and therefore, the underfloor airflow F1 that reaches the distal end 24A of the first inclined portion 24 flows along the guide portion 26 toward the vehicle rear side. Thus, separation of the underfloor airflow F1 at the distal end 24A of the first inclined portion 24 is suppressed, and vortex flow arising at the distal end portion of the first inclined portion 24 can be suppressed. As a result, hot air within the engine compartment 12 can be discharged-out even better from the exhaust portion 40.

Moreover, the guide portion 26 extends from the distal end 24A of the first inclined portion 24 toward the vehicle rear side, and therefore, the directions of the underfloor airflow F1 and the exhaust flow F2, that flow along the first inclined portion 24, are turned toward the vehicle rear side by the guide portion 26 at the distal end portion of the first inclined portion 24. Due thereto, underfloor airflow F1 and the exhaust flow F2, that flow along the first inclined portion 24, can be made to flow smoothly toward the vehicle rear side.

Further, the second inclined portion 34 overlaps the first inclined portion 24 as seen in a vehicle front view, and the distal end 34A of the second inclined portion 34 overlaps the distal end portion of the first inclined portion 24 as seen in a vehicle plan view. Therefore, as seen from a direction orthogonal to the first inclined portion 24, the amount by which the first inclined portion 24 and the second inclined portion 34 overlap can be made to be large. Due thereto, within the exhaust portion 40, the distance over which the exhaust flow F2 flows along both the second inclined portion 34 and the first inclined portion 24 can be set to be long. Accordingly, the flow adjusting effect of the second inclined portion 34 and the first inclined portion 24 on the exhaust flow F2 can be strengthened.

Note that, in the first embodiment, the guide portion 26 is formed at the first inclined portion 24. However, the guide portion 26 may be omitted or the direction in which the guide portion 26 extends may be changed appropriately, in accordance with the aerodynamic characteristic of each type of vehicle. For example, the guide portion 26 may be extended toward the vehicle upper side from the distal end 24A of the first inclined portion 24 as seen in side view.

(Second Embodiment)

Figure 3:
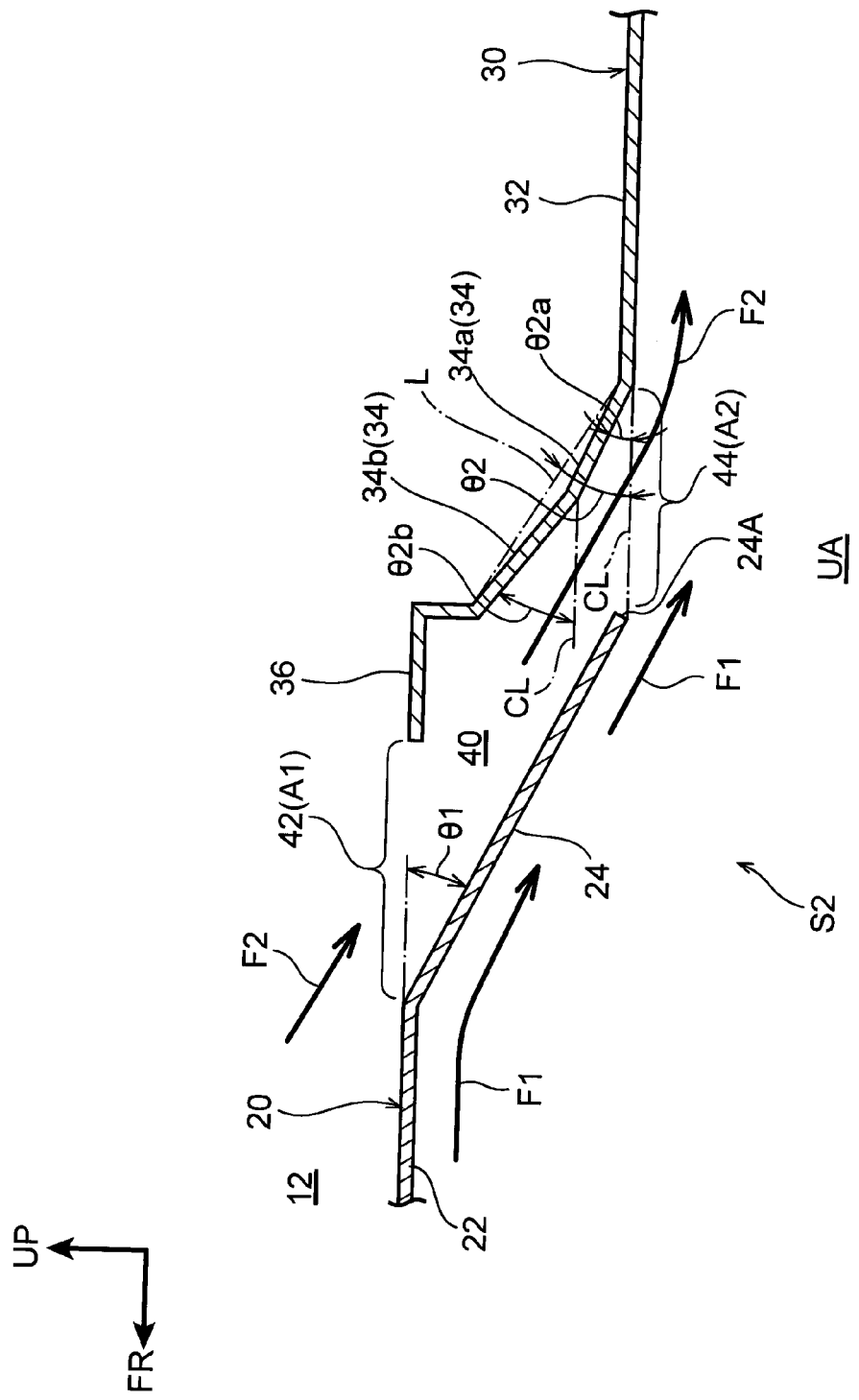
FIG. 3 is a side sectional view that corresponds to FIG. 1 and shows a first inclined portion of a first undercover and a second inclined portion of a second undercover that are used in a vehicle lower portion structure relating to a second embodiment.

A vehicle lower portion structure S2 of a second embodiment is described hereinafter by using FIG. 3. The second embodiment is structured similarly to the first embodiment except for the following points. Namely, in the second embodiment, the second inclined portion 34 is divided into plural (two in the present embodiment) inclined portions, and these divisional inclined portions are divisional inclined portions 34a, 34b. Further, at the second inclined portion 34, an inclination angle θ2a at the root portion of the divisional inclined portion 34a that is disposed at the vehicle lower side is set to be smaller than an inclination angle θ2b at the root portion of the divisional inclined portion 34b that is disposed at the vehicle upper side. Further, in the second embodiment, the guide portion 26 of the first inclined portion 24 is omitted, and the rear end portion of the flange portion 36 is bent toward the vehicle lower side and is connected to the upper end of the divisional inclined portion 34b. Note that, in the second embodiment as well, the guide portion 26 may be formed at the first inclined portion 24, and/or the divisional inclined portion 34b may be extended toward the flange portion 36 side and the upper end portion of the divisional inclined portion 34b and the flange portion 36 may be connected.

Moreover, the inclination angle θ2 at the root portion of the second inclined portion 34 in the second embodiment is an inclination angle with respect to the reference line CL of a line segment L that connects the lower end of the divisional inclined portion 34a, that is disposed at the vehicle lower side, and the upper end of the divisional inclined portion 34b, that is disposed at the vehicle upper side.

Further, in the second embodiment as well, the exhaust flow F2 that flows through the interior of the exhaust portion 40 is discharged-out from the outflow opening 44 of the exhaust portion 40 toward the vehicle lower side and the vehicle rear side, and merges with the underfloor airflow F1. Due thereto, hot air within the engine compartment 12 can be made to flow via the exhaust portion 40 toward the underfloor space UA. Accordingly, in the second embodiment as well, operation and effects that are similar to those of the first embodiment can be exhibited.

Further, in the second embodiment, at the second inclined portion 34, the inclination angle θ2a of the divisional inclined portion 34a that is disposed at the vehicle lower side is set to be smaller than the inclination angle θ2b of the divisional inclined portion 34b that is disposed at the vehicle upper side. Therefore, air resistance of the exhaust flow F2, that flows through the interior of the exhaust portion 40 along the second inclined portion 34, can be reduced. Due thereto, the exhaust flow F2 can be discharged-out efficiently from the outflow opening 44 of the exhaust portion 40.

Note that, although the second inclined portion 34 is structured by the two divisional inclined portions 34a, 34b in the second embodiment, the second inclined portion 34 may be structured by three or more divisional inclined portions. Further, in this case, at an adjacent pair of divisional inclined portions, the inclination angle at the root portion of the divisional inclined portion that is disposed at the vehicle lower side is set to be smaller than the inclination angle at the root portion of the divisional inclined portion that is disposed at the vehicle upper side. Namely, the second inclined portion 34 is structured so as to approach the vehicle longitudinal direction while heading toward the vehicle lower side.

Further, although the second inclined portion 34 is structured by plural divisional inclined portions in the second embodiment, the first inclined portion 24 may be structured by plural inclined portions, or the second inclined portion 34 and the first inclined portion 24 may be structured by plural divisional inclined portions. In this case, air resistance of the underfloor airflow F1 that flows along the first inclined portion 24 can be reduced. Due thereto, the underfloor airflow F1 can be made to flow well toward the vehicle rear side.

(Third Embodiment)

Figure 4:
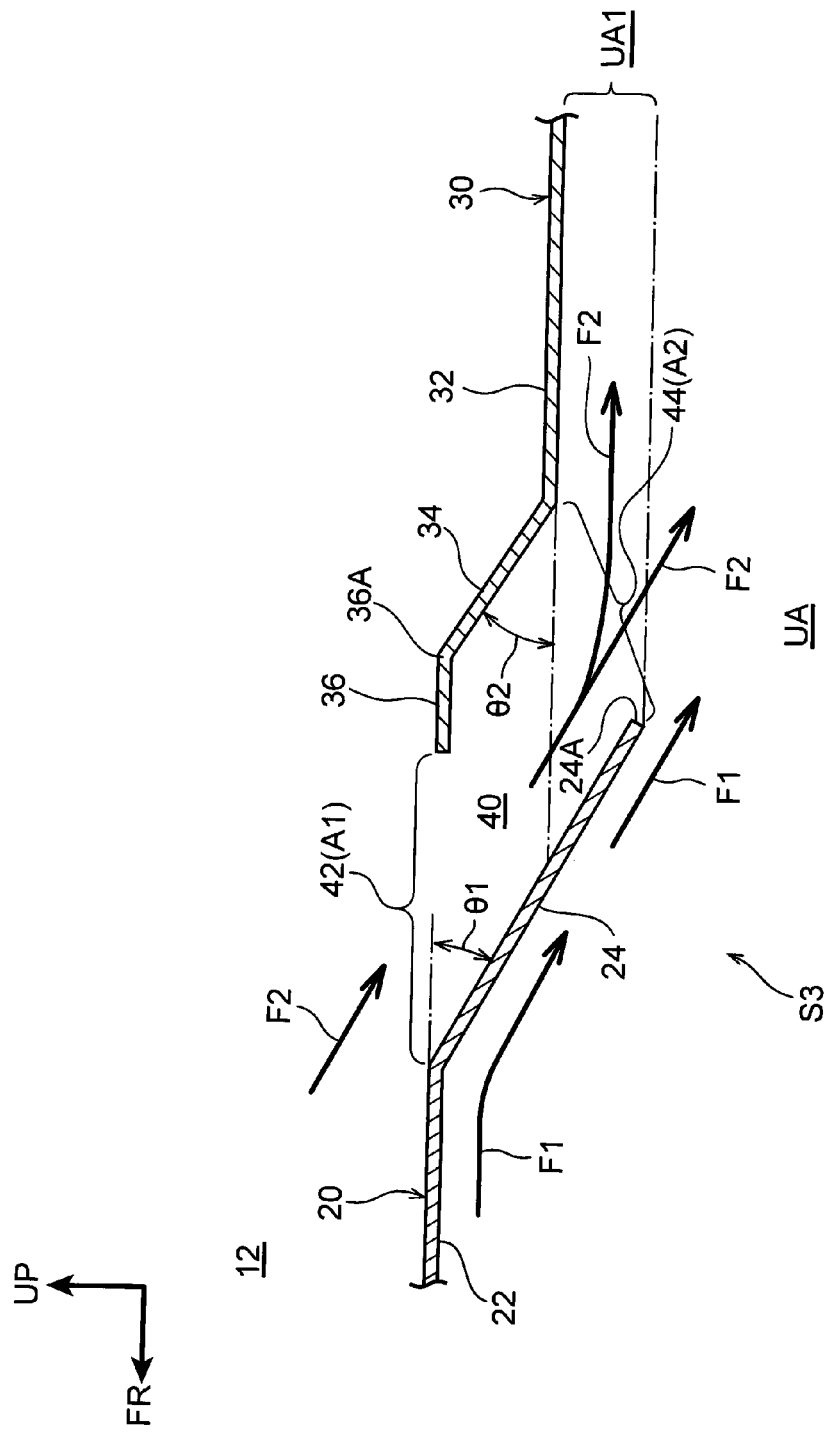
FIG. 4 is a side sectional view that corresponds to FIG. 1 and shows a first inclined portion of a first undercover and a second inclined portion of a second undercover that are used in a vehicle lower portion structure relating to a third embodiment.

A vehicle lower portion structure S3 of a third embodiment is described hereinafter by using FIG. 4. The third embodiment is structured similarly to the first embodiment except for the following points. Namely, in the third embodiment, the distal end 24A of the first inclined portion 24 is disposed further toward the vehicle lower side than the second undercover 30. Namely, the distal end portion of the first inclined portion 24 projects-out further toward the vehicle lower side than the second undercover main body portion 32. Therefore, in a space UA 1 at the vehicle rear side of the outflow opening 44 of the exhaust portion 40 (a space at the vehicle rear side of the distal end portion of the first inclined portion 24), the flow of the underfloor airflow F1 is obstructed by the distal end portion of the first inclined portion 24. Further, in the third embodiment, the guide portion 26 of the first inclined portion 24 is omitted. Note that, in the third embodiment as well, the guide portion 26 may be formed at the first inclined portion 24.

Further, in the third embodiment, when the exhaust flow F2 that flows within the exhaust portion 40 is discharged-out from the outflow opening 44 of the exhaust portion 40, a portion of the exhaust flow F2 flows through the space UA1 toward the vehicle rear side, and another portion of the exhaust flow F2 flows toward the underfloor space UA that is at the vehicle lower side of the space UA1. Due thereto, in the third embodiment as well, hot air within the engine compartment 12 can be made to flow via the exhaust portion 40 toward the underfloor space UA. Accordingly, in the third embodiment as well, operation and effects that are similar to those of the first embodiment are exhibited.

Further, in the third embodiment, as described above, a portion of the exhaust flow F2 flows through the space UA1 toward the vehicle rear side, and another portion of the exhaust flow F2 flows toward the underfloor space UA that is at the lower side of the space UA1. Due thereto, a portion of the exhaust flow F2, that is discharged-out from the exhaust portion 40, flows within the space UA1 where the flow of the underfloor airflow F1 is obstructed. Therefore, as compared with the first embodiment, interference between the exhaust flow F2 and the underfloor airflow F1 can be suppressed. As a result, generation of turbulent flow at the underfloor space UA can be suppressed more.

Note that, in the first embodiment through the third embodiment, the first undercover 20 and the second undercover 30 are each structured by one member. Instead, each of the first undercover 20 and the second undercover 30 may be structured by plural members, and these members may be assembled so as to integrally form the first undercover 20 and the second undercover 30 respectively. Further, the first undercover 20 and the second undercover 30 may be formed integrally.

Further, in the first embodiment through the third embodiment, the first undercover 20 is structured so as to cover the engine compartment 12 from the vehicle lower side. Further, the second undercover 30 is structured so as to cover the underfloor, between the front wheels 16 and the rear wheels 18, from the vehicle lower side. Instead, the sizes of the first undercover 20 and the second undercover 30 may be changed appropriately. For example, the front end portion of the first undercover 20 may be extended toward the vehicle front side to the front end portion of the vehicle 10, and/or the rear end portion of the second undercover 30 may be extended toward the vehicle rear side to the rear end portion of the vehicle 10. Namely, there may be a structure in which substantially the entire surface of the underfloor of the vehicle 10 is covered by the first undercover 20 and the second undercover 30. Due thereto, the air resistance of the vehicle 10 can be reduced more, and the aerodynamic performance can be improved more.

Moreover, in the first embodiment through the third embodiment, ribs, that extend in the vehicle longitudinal direction as seen in a vehicle plan view, may be formed at the interior of the exhaust portion 40. Due thereto, for example, the wind direction of the exhaust flow F2 that is discharged-out from the exhaust portion 40 can be adjusted in accordance with the aerodynamic characteristic of each type of vehicle. Further, in this case, there may be a structure in which the first inclined portion 24 and the second inclined portion 34 are connected by the ribs. Due thereto, the strength of the first inclined portion 24 and the second inclined portion 34 can be increased.

Further, in the first embodiment through the third embodiment, the entire second inclined portion 34 overlaps the first inclined portion 24 as seen in a vehicle front view, and the second inclined portion 34 and a portion of the first inclined portion 24 overlap as seen in a vehicle plan view. Instead, there may be a structure in which the second inclined portion 34 overlaps a portion of the first inclined portion 24 as seen in either one of a vehicle plan view or a vehicle front view.

Moreover, in the first embodiment through the third embodiment, the first undercover 20 and the second undercover 30 are structured of resin materials, but the materials of the first undercover 20 and the second undercover 30 are not limited to this. For example, the first undercover 20 and the second undercover 30 may be structured of an aluminum alloy or carbon or the like.

The disclosure of Japanese Patent Application No. 2013-188472 is, in its entirety, incorporated by reference into the present Description. All publications, patent applications, and technical standards mentioned in the present Description are incorporated by reference into the present Description to the same extent as if such individual publication, patent application, or technical standard was specifically and individually indicated to be incorporated by reference.

The invention claimed is:

1. A vehicle lower portion structure comprising:
a first undercover that is provided at a vehicle lower portion, and that covers, from a vehicle lower side, an engine compartment that is at a vehicle front portion;
a second undercover that is provided at a vehicle rear side of the first undercover, and that covers, from a vehicle lower side, an underfloor that is at a vehicle rear side of the first undercover;
a first inclined portion provided as a rear end portion of the first undercover, the first inclined portion is angled toward a vehicle lower side and a vehicle rear side; and
a second inclined portion provided as a front end portion of the second undercover, the second inclined portion is angled toward a vehicle upper side and a vehicle front side, is disposed so as to be apart from the first inclined portion at a vehicle rear side of the first inclined portion, and overlaps at least a portion of the first inclined portion as seen in at least one of a vehicle plan view or a vehicle front view,
wherein the second inclined portion includes a plurality of inclined portions, and
wherein an adjacent pair of the plurality of inclined portions includes a first adjacent inclined portion that is disposed at a vehicle lower side and a second adjacent inclined portion that is disposed at a vehicle upper side, an inclination angle of the first adjacent inclined portion with respect to a line extending along a vehicle longitudinal direction is set to be smaller than an inclination angle of the second adjacent inclined portion with respect to the line extending along the vehicle longitudinal direction.

2. The vehicle lower portion structure of claim 1, wherein an inclination angle of the second inclined portion with respect to the vehicle longitudinal direction is set to be greater than or equal to an inclination angle of the first inclined portion with respect to the vehicle longitudinal direction.

3. The vehicle lower portion structure of claim 1, wherein a guide portion, that extends from a distal end of the first inclined portion toward the second inclined portion, is formed at the first inclined portion.

4. The vehicle lower portion structure of claim 1, wherein a distal end of the first inclined portion is disposed further toward a vehicle lower side than the second undercover.

5. The vehicle lower portion structure of claim 1, wherein the second inclined portion overlaps at least a portion of the first inclined portion as seen in a vehicle plan view and a vehicle front view.

6. A vehicle lower portion structure comprising:
a first undercover that is provided at a vehicle lower portion, and that covers, from a vehicle lower side, an engine compartment that is at a vehicle front portion;
a second undercover that is provided at a vehicle rear side of the first undercover, and that covers, from a vehicle lower side, an underfloor that is at a vehicle rear side of the first undercover;
a first inclined portion provided as a rear end portion of the first undercover, the first inclined portion is angled toward a vehicle lower side and a vehicle rear side; and
a second inclined portion provided as a front end portion of the second undercover, the second inclined portion is angled toward a vehicle upper side and a vehicle front side, and is disposed so as to be apart from the first inclined portion at a vehicle rear side of the first inclined portion
wherein the second inclined portion includes a plurality of inclined portions, and
wherein an adjacent pair of the plurality of inclined portions includes a first adjacent inclined portion that is disposed at a vehicle lower side and a second adjacent inclined portion that is disposed at a vehicle upper side, an inclination angle of the first adjacent inclined portion with respect to a line extending along a vehicle longitudinal direction is set to be smaller than an inclination angle of the second adjacent inclined portion with respect to the line extending along the vehicle longitudinal direction, and
wherein the second inclined portion overlaps at least a portion of the first inclined portion as seen in a vehicle plan view and a vehicle front view.

7. The vehicle lower portion structure of claim 6, wherein an inclination angle of the second inclined portion with respect to the vehicle longitudinal direction is set to be greater than or equal to an inclination angle of the first inclined portion with respect to the vehicle longitudinal direction.

8. The vehicle lower portion structure of claim 6, wherein a guide portion, that extends from a distal end of the first inclined portion toward the second inclined portion, is formed at the first inclined portion.

* * * * *